United States Patent

[11] 3,604,271

| [72] | Inventor | Charles B. Matson<br>Cincinnati, Ohio |
|---|---|---|
| [21] | Appl. No. | 759,171 |
| [22] | Filed | Sept. 11, 1968 |
| [45] | Patented | Sept. 14, 1971 |
| [73] | Assignee | Cincinnati Milacron Inc. |

[54] SENSING DEVICE FOR DETERMINING THE UNBALANCE OF A GRINDING WHEEL
8 Claims, 5 Drawing Figs.

[52] U.S. Cl. ................................................ 73/458, 51/169
[51] Int. Cl. ........................................... G01m 1/28
[50] Field of Search ........................................ 51/169, 165, 34 C; 73/457, 458, 71.4

[56] References Cited
UNITED STATES PATENTS

| 2,241,637 | 5/1941 | Ernst et al. | 51/169 X |
| 2,329,905 | 9/1943 | Huff | 51/34 C |
| 2,915,918 | 12/1959 | Comstock et al. | 51/169 UX |
| 3,095,676 | 7/1963 | Voller | 51/169 |
| 3,107,459 | 10/1963 | Backer | 51/169 |

FOREIGN PATENTS

| 1,093,503 | 12/1967 | Great Britain | 51/169 |

*Primary Examiner*—James J. Gill
*Attorney*—Frank C. Leach, Jr.

ABSTRACT: Means, which moves a grinding wheel into and out of engagement with a workpiece, has sensing means mounted thereon for movement therewith. The sensing means senses the magnitude of the force exerted on the moving means whereby the sensing means produces a signal that is indicative of the magnitude of unbalance of the grinding wheel.

PATENTED SEP 14 1971
3,604,271
FIG. 1
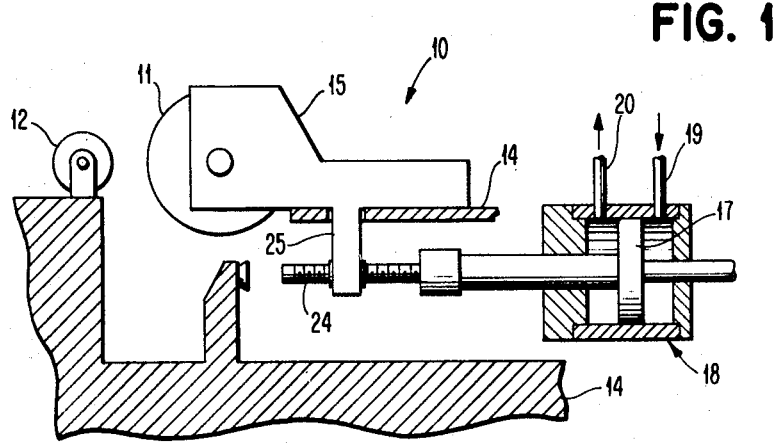
FIG. 2
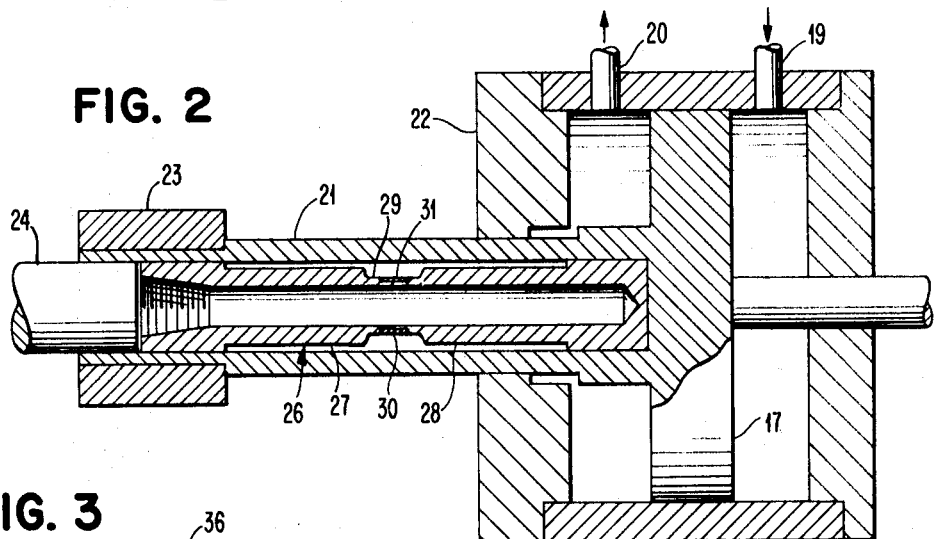
FIG. 3
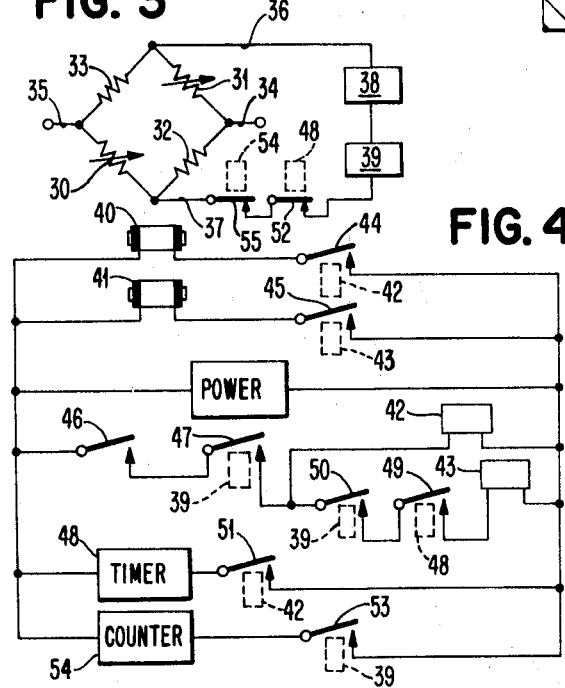
FIG. 4
FIG. 5
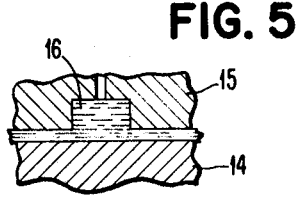
INVENTOR.
CHARLES B. MATSON
BY *Frank C. Leach jr.*
ATTORNEY.

SENSING DEVICE FOR DETERMINING THE UNBALANCE OF A GRINDING WHEEL

In a grinding machine, the grinding wheel cannot be permanently balanced so that it tends to become unbalanced during grinding operations. Permanent balancing of the grinding wheel is prevented because the materials, which form the grinding wheel, are not uniformly distributed throughout the grinding wheel.

U.S. Pat. No. 2,507,558 to Dall et al. discloses means for balancing a grinding wheel. The mechanism of the Dall et al. patent depends upon the operator of the grinding machine recognizing that the wheel is becoming unbalanced. However, the operator of the grinding machine may fail to observe that the machine is becoming unbalanced and not utilize the balancing mechanism until at least one workpiece has been damaged during grinding so as to not be usable. For example, the workpiece could have chatter marks formed thereon.

It has previously been suggested to balance a grinding wheel automatically through measuring the difference in pressures on opposite sides of a hydrostatic bearing, which supports the grinding wheel spindle. This difference in pressure has been utilized to cause a pair of motors to drive balance weights, which are on the grinding wheel spindle, in perpendicular directions away from the components of the unbalanced force.

The present invention satisfactorily solves the problem of balancing the grinding wheel without requiring the complicated mechanism of the two balance weights being moved in perpendicular directions by a pair of motors. The present invention permits utilization of a balancing mechanism of the type shown in the aforesaid Dall et al. patent whereby the operator may manually balance the wheel or the wheel may be balanced automatically utilizing the dynamic balancing mechanism of the aforesaid Dall et al. patent. Since the present invention permits balancing manually by utilizing the balancing mechanism of the aforesaid Dall et al. patent, the sensing device of the present invention may be utilized with present grinding machines. Thus, this would permit utilization of the present invention without requiring a complicated new balancing mechanism.

The sensing device of the present invention also eliminates any requirement for connections to the pockets of the hydrostatic bearings that support a grinding wheel. Thus, the present invention eliminates the possibility of any leakage of fluid from the hydrostatic bearing pockets as would be required with the previously suggested system for automatically balancing the grinding wheel.

In the present invention, the feed force for feeding the grinding wheel is utilized to detect the unbalance of the grinding wheel. This feed force is approximately equal to the difference between the frictional force and the unbalanced force of the grinding wheel. The frictional force is equal to the product of the mass of all of the movable grinding wheel structure and the coefficient of friction with the coefficient of friction being determined by the type of ways on which the structure slides on its support bed. The unbalanced force is equal to $mew^2 \sin wt$ where $m$ is the mass of the grinding wheel, $e$ is the distance of the unbalance from the axis of the spindle of the grinding wheel, $w$ is the angular velocity of the grinding wheel, and $wt$ is the angle of the unbalance from the vertical with $t$ being time. Thus, the maximum unbalanced force is when the unbalance is located on a horizontal plane.

Therefore, sensing of the feed force, especially during a nongrinding period, will indicate the amount of unbalance of the grinding wheel. If there is no unbalance, then the feed force would be constant since it would be merely equal to the frictional force. Thus, as the unbalance increases, the feed force will vary in magnitude by a superposed unbalanced force varying with the angular velocity of the grinding wheel, and measurement of this feed force with the superposed unbalanced force will indicate the amount of unbalance of the grinding wheel.

An object of this invention is to provide a sensor for determining when a grinding wheel becomes unbalanced.

Another object of this invention is to provide a strain gauge device for determining when a grinding wheel needs to be reconditioned.

Other objects of this invention will be readily perceived from the following description, claims, and drawing.

This invention relates to the combination of a grinding wheel and means to move the grinding wheel into contact with a workpiece to grind the workpiece. The movable means supports means to sense unbalance of the grinding wheel. The sensing means produces a signal that indicates the magnitude of unbalance of the grinding wheel.

This invention also relates to a device for sensing the unbalance of a grinding wheel movable toward and away from a workpiece by means. The device includes sensing means adapted to be supported by the grinding wheel moving means. The sensing means is responsive to the force in the moving means during rotation of the grinding wheel to provide a signal indicative of the magnitude of the unbalance of the grinding wheel.

The attached drawing illustrates a preferred embodiment of the invention, in which:

FIG. 1 is a side sectional view, partly in elevation, of a portion of a grinding machine utilizing the sensing device of the present invention;

FIG. 2 is an enlarged sectional view of the sensing device of the present invention and a portion of the grinding machine cooperating therewith;

FIG. 3 is a schematic circuit diagram of the sensing device of the present invention;

FIG. 4 is a schematic block diagram illustrating a system for automatically balancing a grinding wheel by utilizing the sensing device of the present invention; and FIG. 5 is an enlarged sectional view of a portion of a way on the support bed of a grinding machine.

Referring to the drawing and particularly FIG. 1, there is shown a portion of a grinding machine 10 including a grinding wheel 11, which is supported by a spindle. The spindle of the grinding wheel 11 may be supported in the manner shown and described in the aforesaid Dall et al. patent.

The grinding wheel 11 cooperates with a workpiece 12, which is rotatably mounted on a bed 14 of the grinding machine 10 and rotated at a speed usually lower than the rotating speed of the grinding wheel 11. The workpiece 12 is supported between centers on the bed 14 of the grinding machine 10 in a manner such as that shown and described in U.S. Pat. No. 2,802,312 to Gosney, Jr., et al.

The spindle, which supports the grinding wheel 11, is mounted on a wheel head slide 15, which is adapted to be slidably supported on the bed 14 of the grinding machine 10. The slide 15 is supported on the bed 14 by partial hydrostatic ways 16 (see FIG. 5) whereby partial hydrostatic bearings are formed. It should be understood that full hydrostatic bearings or any other means that eliminates friction during balancing may be employed.

The slide 15 is movable toward and away from the workpiece 12 through suitable movable means. The movable means for the slide 15 includes a feed piston 17, which is slidably supported within a cylinder 18 fixed to the bed 14 of the grinding machine 10. Fluid may be supplied to opposite ends of the cylinder 18 through hoses 19 and 20 whereby the position of the feed piston 17 within the cylinder 18 may be adjusted as desired.

It should be understood that the sensing device of the present invention is utilized to sense the unbalance of the grinding wheel 11 when the grinding wheel is in its slow feed in a restricted range of the machine because of the partial hydrostatic bearings 16. In the home position, there is no feed force being exerted on the feed piston 17 so that the signal cannot be obtained at this time especially if frictional forces are high.

The feed piston 17 has a hollow cylindrical rod 21 (see FIG. 2) extending outwardly through an end cap 22 of the cylinder 18 for connection through a coupling 23 to a screw-threaded member 24. The screw-threaded member 24 is connected to a downwardly depending portion 25 of the slide 15. The screw-threaded member 24 and the portion 25 of the slide 15 are fixedly secured to each other whereby movement of the feed piston 17 in the cylinder 18 causes the slide 15 and the portion of the bed 14 of the grinding machine 10 on which the slide 15 is mounted to move toward or away from the workpiece 12.

As shown in FIG. 2, the hollow cylindrical rod 21 of the feed piston 17 has a hollow cylindrical-shaped member 26 fixedly secured therein. The member 26 has its ends enlarged for securing to the hollow cylindrical rod 21 of the feed piston 17. The member 26 includes reduced portions 27 and 28, which are adjacent the ends of the member 26, and a centrally located intermediate portion 29, which is smaller in diameter than either of the reduced portions 27 and 28. It should be understood that the intermediate portion 29 may be other than centrally located if desired.

As previously mentioned, the unbalanced force is obtained by the sensing device of the present invention through measuring the feed force, which increases and decreases at a frequency equal to the angular velocity $w$ of the grinding wheel 11 due to the unbalance of the grinding wheel 11. Thus, when the force on the feed piston 17 in increased or decreased, the compressive strain on the member 26 will be increased or decreased whereby the length of the member 26 is shortened or lengthened, respectively. Accordingly, by measuring the strain on the member 26 and utilizing the change in the length of the member 26 due to this strain, an amplified signal of the unbalanced force of the grinding wheel 11 may be obtained by the sensing device of the present invention.

The intermediate portion 29 has a pair of strain gauges 30 and 31 mounted thereon in diametrically disposed relationship to each other. The intermediate portion 29 also has a pair of inactive strain gauges 32 and 33 (see FIG. 3) mounted thereon at 90° from each of the active strain gauges 30 and 31. The gauges 32 and 33 are also diametrically disposed to each other. The gauges 32 and 33 are mounted on the intermediate portion 29 in a manner so that they are not responsive to any strains in the member 26 due to the force of the feed piston 17.

As shown in FIG. 3, the strain gauges 30 and 31 and the gauges 32 and 33 are connected to each other to form a Wheatstone bridge. The bridge circuit has input leads 34 and 35 connected to two opposite corners of the bridge circuit whereby an electric potential may be supplied to the circuit. The bridge circuit has output leads 36 and 37 connected to the two other corners of the bridge circuit from those to which the input leads 34 and 35 are connected.

As shown in FIG. 3, the output lead 36 is connected through amplification stages 38 to a control 39. The control 39 is connected to the output lead 37 of the bridge circuit. The control 39 may be an indicating device, which could be either audio or visual, or may be utilized to control relays to automatically balance the grinding wheel 11.

When the control 39 is employed to control relays, the control 39 may be a meter relay. When the control 39 is a meter relay, the control 39 is activated when the maximum current flowing therethrough during each cycle of rotation of the grinding wheel 11 increases to a predetermined value. When this occurs, the control 39 remains activated until it is inactivated by the maximum current flowing therethrough dropping to a predetermined value.

Accordingly, as the unbalance of the grinding wheel 11 increases, the maximum force on the hollow cylindrical rod 21 of the feed piston 17 increases during each rotation of the grinding wheel 11. This results in the maximum potential on the output leads 36 and 37 becoming greater whereby the maximum current flowing through the control 39 during each cycle of rotation of the grinding wheel 11 increases. This is because the resistances of the strain gauges 30 and 31 decrease to a minimum when the maximum increased strain thereon occurs during each cycle of rotation of the grinding wheel 11 due to the increasing unbalance of the grinding wheel 11. The inactive gauges 32 and 33 are merely electrically conductive elements that are employed to compensate for any temperature changes and keep the Wheatstone bridge in balance.

Furthermore, by mounting the strain gauges 30 and 31 and the inactive gauges 32 and 33 on the intermediate portion 29 of the member 26, a mechanical amplification of the signal is obtained since the force, which is produced by the unbalance on the grinding wheel 11, is sensed along the longitudinal axis of the member 26. Thus, as the unbalance of the grinding wheel 11 increases, the length of the member 26 is decreased and increased at the frequency of the grinding wheel rotational speed. This decrease or increase in the length of the member 26 not only causes mechanical amplification of the signal to the strain gauges 30 and 31 but also results in the resistances of the strain gauges 30 and 31 decreasing or increasing due to their lengths being increased or decreased, respectively.

However, while the current flowing through the control 39 will sinusoidally vary from a maximum to a minimum, only the maximum current is utilized to cause activation and inactivation of the control 39 when the control 39 is a meter relay. Thus, only the maximum decrease of the length of the member 26 is pertinent to the signal to the control 39 when the control 39 is responsive to the maximum current flowing therethrough.

Considering the operation of the sensing device of the present invention when the control 39 is a visual indicator such as a meter, for example, the control 39 will disclose the magnitude of unbalance of the grinding wheel 11. Accordingly, when the unbalance of the grinding wheel 11 begins to approach a magnitude at which the workpiece 12 will be damaged so as to not be usable, the operator of the grinding machine 10 balances the grinding wheel 11 by utilizing the mechanism shown and described in the aforesaid Dall et al. patent.

In addition to balancing the grinding wheel, the grinding wheel 11 also may be dressed or trued at this time if such is needed. These operations would normally be performed on the grinding wheel 11 between grinding various workpieces 12.

While the control 39 has been described as being a visual indicator such as a meter, for example, it should be understood that it could be a light or a noise producer if desired. Furthermore, the light or noise producer could be used with the visual indicator if desired. That is, in addition to a meter indicating the amount of unbalance of the grinding wheel 11, the control 39 also could have a light that would gain the operator's attention when the unbalancing of the grinding wheel 11 exceeds a predetermined magnitude. Likewise, the noise producer could be actuated when unbalancing of the grinding wheel 11 exceeds a predetermined magnitude rather than utilizing the light if desired.

As previously mentioned, the control 39 of the sensing device may be utilized to control relays to automatically balance the grinding wheel 11. The automatic balancing of the grinding wheel 11 could be obtained by utilizing the balancing mechanism of the aforesaid Dall et al. patent.

In such an arrangement, the manual handle, which is utilized in the aforesaid Dall et al. patent to release one end of the spindle and to release balancing balls after the spindle has been released at one end, may be replaced. Instead of manually unclamping one end of the spindle of the grinding wheel 11 by rotating the manual handle of the aforesaid Dall et al. patent, a hydraulic piston, which is controlled by a solenoid 40 (see FIG. 4), may be connected to the unclamping mechanism of the aforesaid Dall et al. patent. Furthermore, instead of releasing the balancing balls of the aforesaid Dall et al. patent by further actuation of the manual handle, this would be accomplished by controlling fluid flow to the chamber, which has the plunger that releases the balancing weights in the aforesaid Dall et al. patent, through a solenoid 41.

A relay 42 controls energization of the solenoid 40 while a relay 43 controls energization of the solenoid 41. Thus, the solenoid 40 will be energized to allow unclamping of the spindle of the grinding wheel 11 only when the relay 42 is picked to cause its normally open contact 44 to close. Likewise, energization of the solenoid 41 to release the balancing balls occurs only when the relay 43 is picked to close its normally open contact 45 in a circuit including the solenoid 41.

As shown in FIG. 4, the relay 42 is connected in a circuit with a limit switch 46 and a normally open contact 47 of the control 39. The limit switch 46 is closed only when the grinding wheel 11 is in its retracted home position.

Accordingly, when the control 39 is energized due to the unbalance of the grinding wheel 11 exceeding a predetermined magnitude as represented by the maximum current flowing through the control 39 exceeding a predetermined value, the control 39 is energized. With the grinding wheel 11 in its retracted home position, the energization of the control 39 causes the relay 42 to be picked. Accordingly, picking of the relay 42 closes its normally open contact 44 to cause the solenoid 40 to be energized whereby one end of the spindle of the grinding wheel 11 is released in the manner more particularly shown and described in the aforesaid Dall et al. patent.

After one end of the spindle of the grinding wheel 11 is unclamped or released, sufficient time must be permitted to elapse to let the spindle of the grinding wheel 11 settle. Accordingly, a timer 48 may be utilized to control when the relay 43, which controls the solenoid 41 through the contact 45, is picked. Thus, the relay 43 is picked when a normally open contact 49 of the timer 48 is closed since a normally open contact 50 of the control 39 closed when the control 39 was activated.

The timer 48 is activated when a normally open contact 51 of the relay 42 is closed due to the relay 42 being picked. Thus, the timer 48 starts to run as soon as the relay 42 is picked to cause release or unclamping of the one end of the spindle of the grinding wheel 11.

When the timer 48 has been activated for the predetermined period of time, the normally open contact 49 of the timer 48 closes whereby the relay 43 is picked since the limit switch 46 is closed due to the grinding wheel 11 being in its retracted home position and the normally open contacts 47 and 50 of the control 39 are closed since the control 39 has been energized. Thus, the balls are not released until one end of the spindle of the grinding wheel 11 has been unclamped and has had a predetermined period of time to settle.

When the balancing balls of the aforesaid Dall et al. patent are released due to energization of the solenoid 41, the balancing mechanism of the aforesaid Dall et al. patent automatically balances the grinding wheel 11. When the oscillation of the unclamped spindle decreases to a value at which the maximum current through the control 39 drops so that the control 39 no longer remains energized, the contacts 47 and 50 open.

The contact 47 is designed so that it does not open until a predetermined period of time after the control 39 is inactivated. Thus, the contact 50 opens prior to the contact 47.

As a result, the relay 43 is inactivated before the relay 42 is inactivated. This results in the solenoid 41 being deenergized prior to the solenoid 40 being deenergized. As a result, the balancing balls are locked in a balancing position before the one end of the spindle of the grinding wheel 11 is again clamped. This arrangement insures that the balancing balls of the aforesaid Dall et al. patent are clamped in the desired position to balance the grinding wheel 11 before the one end of the spindle is clamped.

In the automatic operation, the operator of the grinding machine 10 starts a grinding cycle by actuating a start button. This results in the grinding wheel 11 being advanced into engagement with the workpiece 12 to grind it. When the grinding wheel 11 is retracted from engagement with the workpiece 12, it engages the limit switch 46, which activates the sensor circuit by providing an input to the input leads 34 and 35.

If the magnitude of the unbalance is such that it does not exceed the predetermined magnitude, the control 39 will not be activated; this permits the grinding wheel 11 to again be returned into engagement with the workpiece 12. However, if the output of the bridge circuit exceeds a predetermined magnitude, the control 39 deactivates the start button of the grinding machine 10. This insures that no grinding of the workpiece 12 can occur when the spindle of the grinding wheel 11 is unclamped.

Then, the control 39 causes energization of the solenoid 40 through picking of the relay 42 to automatically unclamp one end of the spindle of the grinding wheel 11 in the manner previously described. After the timer 48 has been activated for the predetermined period of time in which the spindle of the grinding wheel 11 is allowed to settle, the solenoid 41 is energized by picking of the relay 43 whereby the balancing balls of the aforesaid Dall et al. patent are released.

When the maximum current supplied to the control 39 decreases to a predetermined value to indicate that the grinding wheel 11 is balanced, the control 39 is inactivated. This clamps the balancing balls in a new position and then clamps the free end of the spindle of the grinding wheel 11 in the manner previously described.

If the unbalance of the grinding wheel 11 is not reduced sufficiently for the control 39 to be inactivated within a predetermined period of time, the timer 48 causes its normally closed contact 52 (see FIG. 3) in the lead 37 to open. As a result, the control 39 is inactivated. This results in the relay 43 being inactivated because of the opening of the contact 50 of the control 39. As previously mentioned, the contact 47 does not open for a predetermined period after the contact 50 is open so that the balancing balls are clamped before the end of the spindle is clamped.

When the contact 47 of the control 39 opens, the relay 42 is deenergized. This results in the contact 51 of the relay 42 opening whereby the timer 48 is inactivated.

When the timer 48 is inactivated, the contact 52 returns to its closed position whereby the control 39 is again connected to the Wheatstone bridge circuit. With the unbalance still existing, the previously balancing steps of unclamping the spindle and then the balancing balls through energization of the solenoids 40 and 41, respectively, occurs. This balancing operation continues for the predetermined period until the timer 48 has been operated sufficiently to again cause the normally closed contact 52 to open if balancing has not occurred by this time.

As shown in FIG. 4, each energization of the control 39 results in a normally open contact 53 being closed. This causes a counter 54 to be activated to count the number of times that the balancing of the wheel 11 is attempted. When the counter 54 has been activated for a predetermined number of cycles, it provides an output to produce a signal such as an audio or visual signal, for example, to indicate to the operator that dressing of the grinding wheel 11 is required. When the counter 54 provides the signal after the predetermined number of periods in which balancing has been attempted, the counter 54 is again returned to its zero position. Thus, after dressing, the same number of periods of balancing may be attempted before another dressing would be required.

When the counter 54 is energized to produce the audio or visual signal, it also results in a normally closed contact 55 of the counter 54 being open. The contact 55 is disposed in the lead 37 so that opening thereof results in the control 39 being inactivated. However, suitable means are provided to maintain the start button of the grinding machine 10 deactivated even though the control 39 is inactivated. Furthermore, the start button of the grinding machine 10 cannot be activated until the grinding wheel 11 is balanced.

After the dressing has been completed, the control 39 is again activated through a pushbutton. The previous balancing cycles are continued until the counter 54 is again energized. Another dressing might be attempted at this time or a new grinding wheel might be substituted.

If the grinding wheel 11 should be too far out of balance to be balanced, it is necessary for this condition to also be observed. Accordingly, a differential transformer is utilized to measure the amplitude of the spindle of the grinding wheel 11 with the balancing balls unclamped through mounting the core of the transformer on the journal bearing for the free end of the spindle of the grinding wheel 11. The output of the differential transformer could activate a warning signal, visual or audio, when the amplitude of the spindle of the grinding wheel 11 was such that balancing of the grinding wheel 11 was not possible due to the magnitude of unbalance. This activating signal also could inactivate the control 39 to cause the balls and the free end of the spindle of the grinding wheel 11 to be automatically clamped.

Furthermore, the frictional force must be such that it is not greater than the unbalanced force when the slide is not moving. Therefore, if the coefficient of friction and the total mass of the movable structure including the grinding wheel 11 should be such that the frictional force exceeds the unbalanced force, then the unbalanced force could not be detected. Thus, if the frictional force should exceed the unbalanced force, it would be necessary to utilize other types of ways or to produce a dither in the same direction as the frictional force to negate the frictional force in which case the dither force would need to be cancelled. If vertical dither was used, i.e., 90° to the friction force, no cancellation would be required.

In order to obtain the desired balancing of the grinding wheel 11, it is necessary that there be no unbalance of the motor, which drives the grinding wheel. Otherwise, the sensor would detect the unbalance of the motor.

It also is necessary for the frequency of the sensing system to not be exceeded by the frequency of the exciting system. Otherwise, amplification of the signal to the sensing device would be too large or too small to be usable.

While the sensing device of the present invention has been described as being used with the balancing means of the aforesaid Dall et al. patent, it should be understood that any other suitable grinding wheel balancing means may be employed.

It should be understood that the contacts 52 and 55 are employed in the lead 37 only when automatic balancing is employed. If balancing by the operator is used, then the contacts 52 and 55 are not utilized in the lead 37 since the circuit of FIG. 4 would not be employed.

An advantage of this invention is that it prevents damage to the workpiece due to the grinding wheel being unbalanced. Another advantage of this invention is that it increases the productivity of the operator of the grinding machine. A further advantage of this invention is that it permits the grinding wheel to be automatically balanced.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What I claim is:

1. A device for sensing the unbalance of a grinding wheel while rotatably supported in a grinding machine including:
   means to support said grinding wheel for rotation about an axis, said support means being supported for movement along a path transverse to the axis of said grinding wheel for moving said grinding wheel toward and away from a workpiece;
   a motive power source for moving said support means;
   means connecting said motive power source to said support means;
   means supported by said connecting means to sense the unbalance of said grinding wheel;
   said connecting means including a member;
   and said sensing means including strain gauges mounted on diametrically disposed portions of said member of said connecting means to be responsive to the feed force of said motive power source.

2. The device according to claim 1 in which:
   said member has a reduced intermediate portion;
   and said strain gauges are mounted on the reduced intermediate portion.

3. The device according to claim 1 in which said motive power source includes a fluid responsive piston.

4. A device for sensing the unbalance of a grinding wheel while rotatably supported in a grinding machine including:
   means to support said grinding wheel for rotation about an axis, said support means being supported for movement along a path transverse to the axis of said grinding wheel for moving said grinding wheel toward and away from a workpiece;
   a motive power source for moving said support means;
   means connecting said motive power source to said support means;
   means supported by said connecting means to sense the unbalance of said grinding wheel;
   and said sensing means including means to measure the strains in said connecting means.

5. The device according to claim 4 including hydrostatic bearing means to support said support means.

6. The device according to claim 4 including means responsive to a predetermined magnitude of the signal from said sensing means to produce automatic balancing of said grinding wheel.

7. A device for sensing the unbalance of a grinding wheel while rotatably supported in a grinding machine including:
   means to support said grinding wheel for rotation about an axis, said support means being supported for movement along a path transverse to the axis of said grinding wheel for moving said grinding wheel toward and away from a workpiece;
   a motive power source for moving said support means;
   means connecting said motive power source to said support means;
   means supported by said connecting means to sense the unbalance of said grinding wheel;
   and said sensing means including:
      means to sense the strains in said connecting means;
      and means to provide a signal indicative of the strains in said connecting means.

8. A device for sensing the unbalance of a grinding wheel while rotatably supported in a grinding machine including:
   means to support said grinding wheel for rotation about an axis, said support means being supported for movement along a path transverse to the axis of said grinding wheel for moving said grinding wheel toward and away from a workpiece;
   a motive power source for moving said support means;
   means connecting said motive power source to said support means;
   means supported by said connecting means to sense the unbalance of said grinding wheel;
   and said sensing means comprising strain gauges measuring the strain created in said connecting means by the unbalance of said grinding wheel.